Dec. 8, 1970  J. E. LINDBERG  3,546,689
CRITICAL-TEMPERATURE SENSOR OF THE CONTINUOUS TYPE
Filed Aug. 12, 1968  2 Sheets-Sheet 1
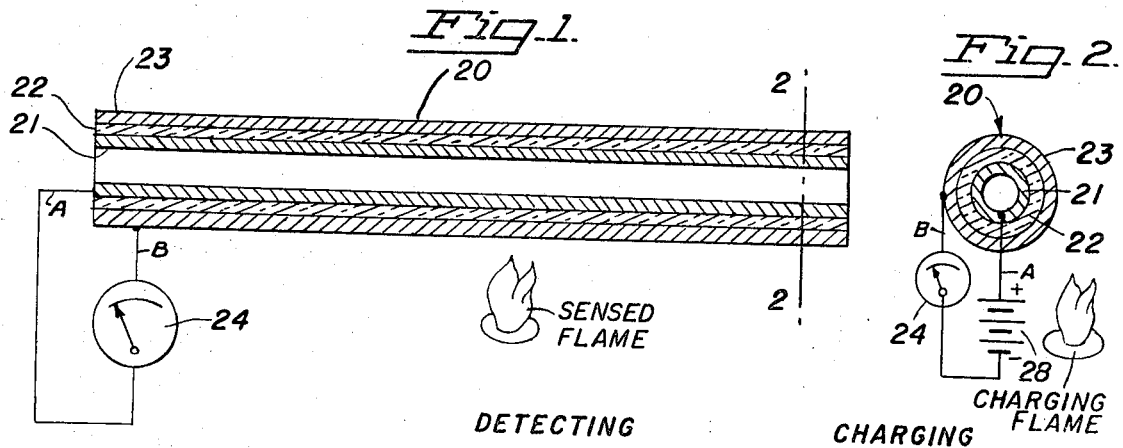
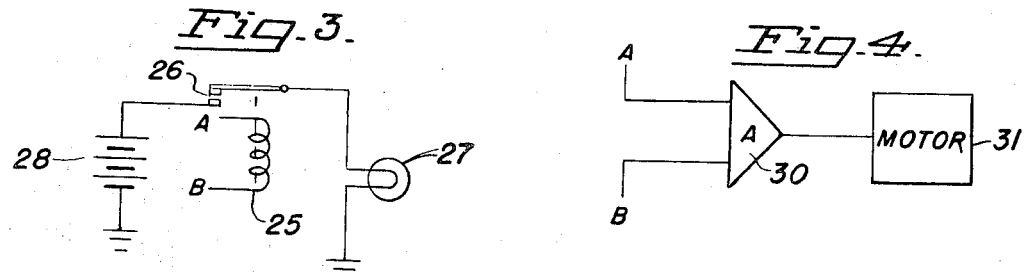
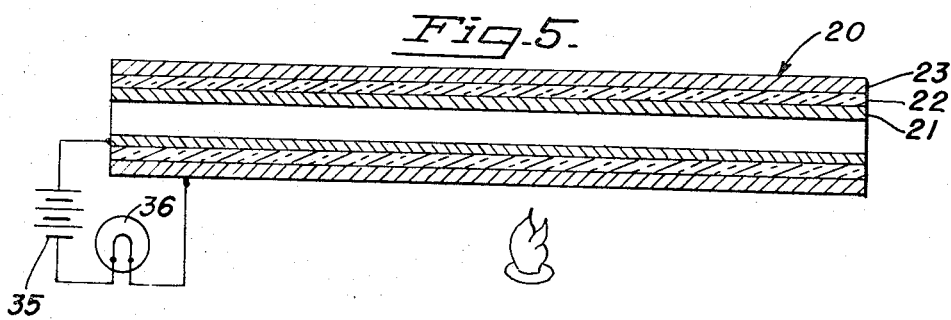
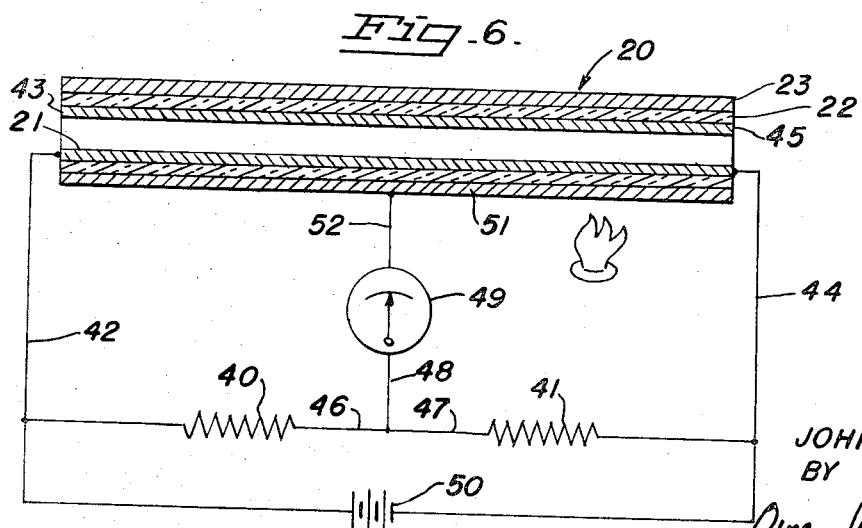
INVENTOR
JOHN E. LINDBERG
BY
Owen, Wickersham & Erickson
ATTORNEYS Dec. 8, 1970        J. E. LINDBERG        3,546,689
CRITICAL-TEMPERATURE SENSOR OF THE CONTINUOUS TYPE
Filed Aug. 12, 1968        2 Sheets-Sheet 2
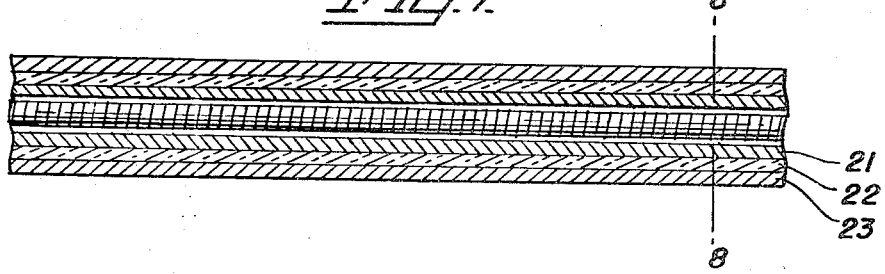
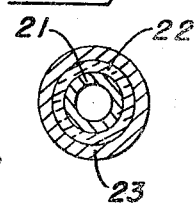
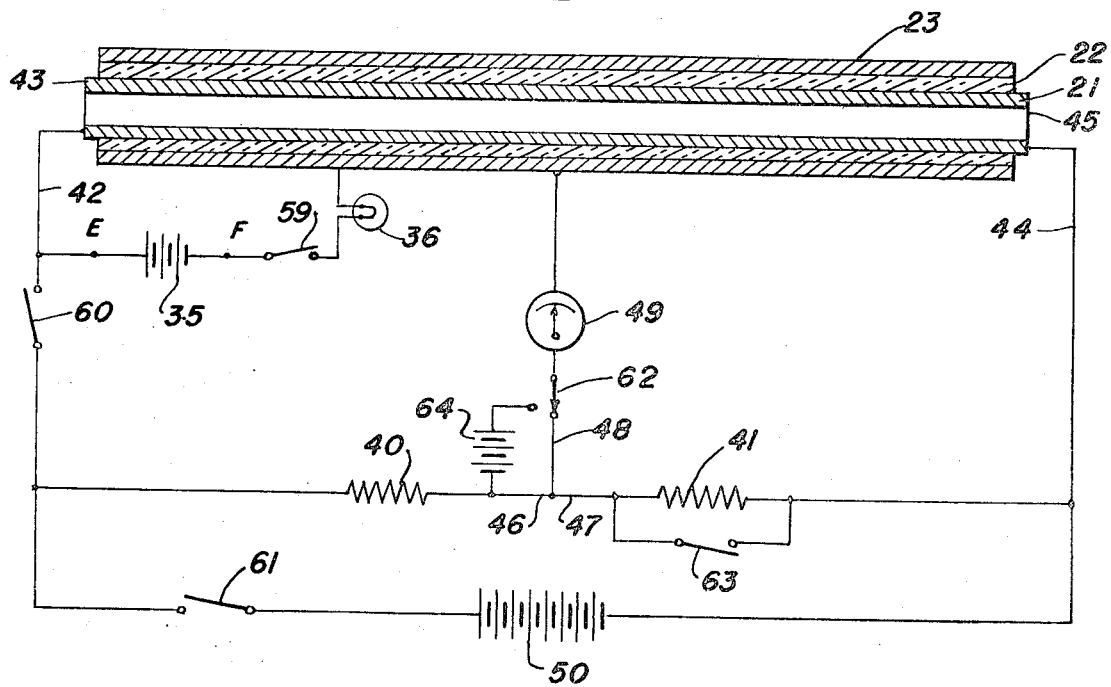
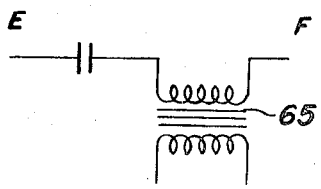
INVENTOR
JOHN A. LINDBERG
BY
Owen, Wickersham & Erickson
ATTORNEYS

United States Patent Office 3,546,689
Patented Dec. 8, 1970

3,546,689
CRITICAL-TEMPERATURE SENSOR OF THE CONTINUOUS TYPE
John E. Lindberg, 1211 Upper Happy Valley Road, Lafayette, Calif. 94549
Continuation-in-part of application Ser. No. 599,212, Dec. 5, 1966. This application Aug. 12, 1968, Ser. No. 777,931
Int. Cl. G08b 17/00
U.S. Cl. 340—227         1 Claim

ABSTRACT OF THE DISCLOSURE

Between two metallic conductors is a thin glass layer, preferably bonded to both conductors. The preferred form has an inner conductor in a tubular outer conductor with only the glass separating them. When heated to a temperature dependent on the characteristics of the glass, this structure undergoes a change in the resistance between the two conductors, apparently due to metal ions flowing in softened or melted glass. When the sensor is heated to render it electrically conductive, unidirectional current is passed through it. Later, when cooled, an electrically actuated indicator is placed across the two conductors in a non-powered circuit, so that when the sensor is later heated again, the indicator can indicate the temperature at which the glass becomes conductive.

---

This application is a continuation-in-part of application Ser. No. 599,212 filed Dec. 5, 1966 now abandoned.

This invention relates to a temperature detection device and more particularly to a temperature sensor of the continuous type for detecting critical temperatures at any point along its length.

The device of this invention has utility in connection with a fire detection apparatus, particularly for detection of fires on airplanes. It is also useful for other temperature detecting.

Airplane fire detection systems have been rather expensive to manufacture and many types of systems have tended to give false warnings. Those patented by me have avoided the false warning problem, but have still tended to be expensive. The present invention provides systems which are substantially proof against false warning and which are also relatively inexpensive. The many advantages as well as other objects and features of this invention will appear from the following discussion of some preferred embodiments.

The invention can be briefly summarized as follows: my new sensor comprises two conductors, such as a wire within a tube, spaced apart by a thin film of glass bonded to both conductors. When the sensor is heated past some critical temperature, the resistance of the glass drops markedly, and this drop of resistance can be used to pass current otherwise blocked by the very high normal resistance of the glass.

In the drawings:

FIG. 1 is a diagrammatic greatly enlarged view in elevation and in section of a device embodying the principles of the invention.

FIG. 2 is a view in section taken along the line 2—2 in FIG. 1, with a modified form of circuit shown instead of the circuit portion of FIG. 1.

FIG. 3 is a circuit diagram of a sub-circuit which can be substituted for the one shown in FIG. 1 between points A and B.

FIG. 4 is a circuit diagram of another sub-circuit which can also be substituted at points A and B for the elements shown in FIG. 1.

FIG. 5 is a view similar to FIG. 1 employing the same type of sensor in combination with a power circuit, the sensor acting in this arrangement as a break-down resistance type of device.

FIG. 6 is a view similar to FIG. 5 of a system enabling the location of the source of heat actuating the device.

FIG. 7 is a fragmentary enlarged view of a modified form of sensor.

FIG. 8 is a view in section taken along the line 8—8 in FIG. 7.

FIG. 9 is a view similar to FIGS. 5 and 6 of a modified circuit arrangement.

FIG. 10 is a view of a circuit element which can be substituted between points E and F in FIG. 9 for the elements shown between points E and F in FIG. 9.

FIG. 1 shows a sensor 20 of this invention, greatly enlarged so far as the thickness is concerned and greatly reduced so far as the length is concerned. An inner tube 21 of metal such as Nichrome, Chromel, Tophet, Constantin, Advance, Copel, stainless steel, other nickel chromium alloys or other suitable metal or alloy, preferably provided with an oxide coating (as by the method shown in my Pat. No. 3,164,493) is coated with a suitable glass material 22, and then the glass 22 is jacketed in an outer conductor of the same material as the tube 21 or a different metal or alloy or other suitable material. The unit 20 is then heated so that the glass 22 is well bonded to both of the conductors 21 and 23.

The glass composition is selected for a desired melting temperature or for desired electrical characteristics such as conductivity at high temperature. The alloys or metals are preferably selected from among those with low temperature coefficients of resistivity.

I have found that when such a sensor 20 is heated, the glass becomes conductive at some definite temperature, which can be termed the "critical temperature," i.e., a certain temperature to be detected or the lower level of a temperature range to be detected. The inner metal member 21 (which may be a wire and need not be tubular) and the outer metal tube 23 are connected by a suitable electrical circuit. For example, in FIG. 1 a suitable millivolt meter 24 is used, and the meter 24 will show a potential only at the time when the glass 22 becomes conductive. In FIG. 2 there is a battery 28 in series with the meter 24. The glass 22 becomes a good conductor at high temperatures, usually near or above the melting point of that glass, thereby causing current to flow through the electric meter 24, and the meter 24 then indicates that the high temperature exists, and gives some indication of its intensity or area.

Starting with the circuit of FIG. 2 when the entire sensor 20 is heated until the glass 22 becomes molten, then the glass becomes conductive and the meter 24 indicates current flow. The sensor 20 may then be cooled to room temperature, the glass 22 solidifies, and current ceases to flow. The battery 28 may then be removed from the circuit, which now becomes like FIG. 1. Now, when the sensor 20 is again heated until the glass 22 again reaches the molten state, the meter 24 again indicates current flow, but this time in the opposite direction. Thus the device may be used to detect heat or fire.

While I am not certain of the theory behind these phenomena, a possible explanation is as follows: Glasses contain metal oxides. When the glass is cold, the motion of the oxide molecules is very highly restricted, and the glass is essentially non-conductive electrically. As the glass 22 is heated and softens, these metal oxide molecules are free to migrate, and, if placed in an electric field (FIG. 2) between two electrodes, they become ionized. The positive ions then migrate to the negative electrode 23 and electrons migrate to the positive electrode 21. If the two electrodes are in contact with the glass, then an electric current flows around the circuit. Thus, the device may be used to detect fire by the conductivity of the glass. The two electrodes may be of the same metal or may be any two metals or conductors of electric current. The electric power may be either D/C or A/C.

An additional feature which may be obtained with this circuit, wherein the electrical resistance of the external circuit is kept low and the mass of the electrodes and glass separator is kept small, then as the glass 22 is heated and becomes conductive, the electric current flowing through the glass causes additional heating of the glass, such that when the fire or other external source of heat is removed, the electrical heating will maintain the glass at a high enough temperature to remain conductive. This then constitutes a "lock-on" indication, that a fire *did* occur, even though it may have been extinguished.

Manually interrupting the current at any time then allows the glass to cool back to the non-conductive state.

Another feature of the device is that the circuit of FIG. 2 may be assembled, and the entire sensor 20 may be heated to a temperature at which the glass 22 is conductive. Time is then allowed for a large percentage of the metal-oxide ions to migrate toward the cathode 23, and then the glass 22 is cooled while the electric voltage is maintained across it. The glass is thus "frozen" in an electrically charged state. The battery 28 may now be removed from the circuit, which is now identical to FIG. 1. Now if the sensor 20 is heated at any point to a temperature which softens the glass 22 and there is no external electrical potential on the electrodes 21 and 23, the molten glass 22 is in an electrically unstable condition; the ions then redistribute themselves, taking electrons from the electrodes and thus causing electrical current to flow around the circuit. This current may be detected by the meter 24 in FIG. 1 or by any other suitable means, such as an amplifier, relay, etc., and therefore indicates a fire.

FIG. 1A is identical to FIG. 1 except it shows the battery added in lead A.

The glass may be of various types, chosen to give desired characteristics, including such types as soda-lime, borosilicate, cobalt, uranium. Glasses of high purity, such as Pyrex and quartz, retain high resistance at relatively high temperatures, possibly partly because of their purity and partly because of their high melting points. A thin layer of quartz tested in a sensor of this invention had a resistance of about twenty or thirty thousand ohms at 1500° F., and a similar test on Pyrex gave several thousand ohms at that temperature. The other glasses named became conductive at much lower temperatures, apparently partly due to their earlier softening and partly due to ionization of metals therein. The ions migrate when the glass becomes fluid. At room temperatures, all these glasses have practically infinite resistance, and this usually continues up to about 500 or 600° F. At 600° F. some glasses had resistances of above 15 megohms, and the resistance dropped to less than one megohm at about 900° F. For soda-lime glass the resistance of samples tested had as little as 3000 ohms resistance at 900° F., and this dropped to about 40 ohms at 1500° F.; at 2000° F., the resistance was only a few ohms. Borosilicate glass has its resistance drop to about 80 ohms at 1500° F. from above 500,000 ohms at 900° F.

As shown in FIGS. 3 and 4, there are several alternates for the simple voltmeter circuit shown in FIG. 1. Thus, in FIG. 3, the inner tube and outer tube are connected across the coil 25 of a relay having a switch 26. Flow of current through the glass 22 thereby closes a circuit and causes a lamp 27 or other warning signal to be lighted or otherwise actuated by a battery 28. The warning lamp 27 may be replaced by any other type of electrical device, and in fact, fire extinguishing equipment or other responsive equipment may be connected thereto if that is desired.

In FIG. 4, the points A and B are connected across an electronic amplifier 30 which may then operate one or several motors 31 or other equipment to perform any desired function of warning, fire extinguishing, and so on.

The system shown so far is operated on a electrolytic effect, but the invention is not restricted to this type of operation. By employing the circuit of FIG. 5, in which there is a battery 35 in series with a warning lamp 36 and across the inner and outer conductors 21 and 23, the system can be operated in a different manner. In this system, the metals of the inner and outer conductors 21 and 23 may be the same metal, or they may be different metals, as shown and described in connection with FIG. 1, if desired.

Stainless steel may be used for both the inner and outer conductors, for it has a desirable corrosion resistance. The glass 22 again becomes conductive when heated past its critical temperature and, in this instance, then acts in effect as a switch, completing the circuit from the battery 35 to the lamp 36. Instead of a battery a source of A/C electrical power may be used. Normally, the high resistance of the glass below the critical temperature prevents operation of the device, but when the sensor 20 is heated above the critical temperature, the glass becomes quite conductive, causing the circuit to be completed and the lamp 36 to be lighted. Of course, it is possible to use other signals than lamps. For example, a meter or an amplifier may again be used, if that is desired.

In the system of FIG. 6, a heat locating means is shown, including two resistors 40 and 41. One lead 42 connects one end 43 of the inner conductor 21 to the resistor 40, while another wire 44 leads from the other end 45 of the inner conductor 21 to the resistor 41, preferably equal in value to the resistor 40. Leads 46 and 47 connect the resistors 40 and 41 to a conductor 48, which leads through a meter 49 and another conductor 52 to the outer conductor 23. In series with the resistors 40 and 41 is a battery 50. The system operates on the Wheatstone bridge principle. When the glass 22 is heated above its critical temperature at any spot 51, the relative resistances of the portions of the inner conductor 21 on the two sides of the point 51, is a measure of the relative distance from the hot spot 51 to the ends of the conductor 21. Thus, the electric meter 49 may be calibrated to read directly the location of the spot 51. Other similar types of locating circuits may be used, and alternating current circuits may be used. The circuit can also be adopted to locate a hot spot in the electrolytic type of operation.

The inner conductor 21 may, if desired, be part of a fire detector of the type shown in my Pat. No. 3,271,043, as in the sensor 55 shown in FIGS. 7 and 8. Inside the tube 21 is a wire 56 of metallic hydride wrapped in molybdenum ribbon 57, the remainder of the space inside the tube 21 being filled with an inert gas such as argon, and the tube 21 then sealed, one end usually communicating with a responder as shown in the referred-to patent.

FIG. 9 shows a somewhat different circuit illustrating the possibility of combining the electrolytic mode of FIG. 1 with the switch mode of FIG. 5 and the spot location mode of FIG. 6 into a single system, switches 59, 60, 61, 62, and 63 and a battery 64 being used to obtain the various types of operation. In an alternative form, shown in FIG. 10, a transformer 65 may be used to replace the battery 35, for alternating current operation at this point.

As an example of the operation of the sensors, one sensor 20 of the type shown in the drawings was prepared from a 321 stainless steel tube 21, which was preoxidized for 10 minutes at 1900 to 2000° F. after cleaning it with 40 percent nitric acid. A glass coating 22 was applied by dipping the material in a glass powder and then heating it to 1600° to 1700° F. for 15 minutes, then dipping two more times and heating it to 1800° F. for 15 minutes. There was a thickness of about 0.0003 or 0.0004 of glass on the outer surface of the tube 21. Then a cold draw was made on preheated annealed nickel, onesixteenth inch tubing 23, and the tube 23 was slid-fit over the glass 22. Subsequent heating resulted in a bond of the glass 22 to the outer jacket 23. At a temperature of about 70° F. an ohm meter connected as in FIG. 1, indicated a resistance of substantially infinity, or open circuit. When a three-inch length of the sensor 20 was heated to 2000° F., the ohm meter showed a dead short in 5 seconds and, upon removal of the sensor 20 from the flame, again showed an open circuit in 10 seconds. A warning-lamp circuit like that of FIG. 3 was tried, and the light came on in one instance at 4.3 seconds and in another at 3.6 seconds and in another at 4.1 seconds. In some other instances, the same 2000° F. temperature applied to 4-inch lengths of the sensor 20 caused the light to come on in 1.5, 1.6 and 3.4 seconds.

A similar test was made on another device, also made from a 321 stainless steel tube 20, 0.040 inch in diameter, with glass 22 approximately 0.0005 inch thick, and a jacket 23 of annealed nickel 0.003 inch thick. Again, a glass compound was used in between the two metal numbers 21 and 23. The resistance changed from infinity to 40 ohms in one instance at 7 seconds when one-eighth of an inch of the sensor 20 was exposed at 1800° F., and in another instance when one-half inch of the sensor was exposed, the resistance dropped at 1800° F. to practically zero. The system appeared to operate at the moment the glass melted and to go off when the glass solidified. In a test device one can feel the glass solidify.

The same type of sensor 20 was tried in the circuit of FIG. 5 using a 6-volt battery 35 and when one-half inch of the sensor 20 was exposed to 1800° F., the lamp 36 was lighted within 5 seconds. With A/C instead of D/C, the same time held for the same conditions.

Some increase in sensitivity can be obtained by use of a larger operating voltage. When the resistance of the sensor 20 starts to drop, the circuit current helps to heat the sensor 20 and helps the glass reach its melting point more quickly. This may sometimes be desirable. A loose sheath 23 has given results, but the response is much faster and much more reliable if the outer tube 23 is snug and is prefused to the glass material 22.

In instances using a meter as in FIG. 1, a flame temperature of 1800° F. applied to a ⅜ inch length of the sensor 20 produced a current of 0.05 milliamp. In another instance, it produced 0.06 milliamp.

The system is unable to give a false warning for an ordinary short, because it merely prevents the proper warning from coming about.

Similar results have been obtained where the inner tube was stainless steel 321 and the outer tube was so-called nickel A. Also, without using electrolytic effects and where both the inner and outer tubes were nickel and where a battery was used, at a temperature of 1800° F. a good response was again obtained.

The determining thing about whether the glass will work is its conductivity at the temperature sought to be detected, as determined by its softening temperature, and the nature and amount of ionizable metal therein, which can become ions when the glass softens.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A method of making and using of a heat detection sensor of the type having a thin coating of glass between two metallic conductors and in contact with them, the glass being normally substantially non-conductive, comprising the steps of
   (1) heating the sensor to melt the glass and render it electrically conductive,
   (2) passing unidirectional electric current through said sensor,
   (3) cooling the sensor so that the glass becomes solid and non-conductive,
   (4) placing an electrically actuated indicator device in a non-powered circuit between the conductors, and
   (5) heating the sensor again, whereupon the melting of the glass, and therefore the temperature at which the glass melts, is indicated by the indicator without any electrical power device in the circuit.

References Cited

UNITED STATES PATENTS

| | | | |
|---|---|---|---|
| 2,804,610 | 8/1957 | Curtis et al. | 340—228 |
| 2,805,272 | 9/1957 | Postal | 136—200X |
| 3,089,339 | 5/1963 | Rogers et al. | 338—26X |
| 3,416,971 | 12/1968 | Hutkin | 340—228X |

THOMAS B. HABECKER, Primary Examiner

D. L. TRAFTON, Assistant Examiner

U.S. Cl. X.R.

73—341, 342; 179—100.41; 200—61.05, 152; 320—1; 338—26; 340—228